United States Patent
Huh

(10) Patent No.: US 9,828,919 B2
(45) Date of Patent: Nov. 28, 2017

(54) APPARATUS AND METHOD FOR CONTROLLING VALVE

(71) Applicants: Hyundai Motor Company, Seoul (KR); Kia Motors Corporation, Seoul (KR)

(72) Inventor: Jeong Ki Huh, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 96 days.

(21) Appl. No.: 14/921,190

(22) Filed: Oct. 23, 2015

(65) Prior Publication Data

US 2017/0002750 A1 Jan. 5, 2017

(30) Foreign Application Priority Data

Jul. 1, 2015 (KR) ........................ 10-2015-0094299

(51) Int. Cl.
 *F01L 1/34* (2006.01)
 *F02D 13/02* (2006.01)
 (Continued)

(52) U.S. Cl.
 CPC ......... *F02D 13/0261* (2013.01); *B60W 20/00* (2013.01); *F02D 13/0215* (2013.01);
 (Continued)

(58) Field of Classification Search
 CPC ............. F02D 13/0261; F02D 13/0249; F02D 41/0052; F02D 41/006; F02D 41/0065; F02D 41/12; F02D 41/2422; F02D 13/0215; F02D 41/0055; F02D 29/02; F01L 1/34; Y02T 10/18; Y02T 10/47; B60W 20/00
 (Continued)

(56) References Cited

U.S. PATENT DOCUMENTS 6,032,623 A * 3/2000 Yamagishi ............... F01L 1/34
123/90.15

FOREIGN PATENT DOCUMENTS

JP 09-158749 6/1997
JP 2005-337163 12/2005
(Continued)

OTHER PUBLICATIONS

Abstract of JP2008-215295A given above, Sep. 2008.*

*Primary Examiner* — Zelalem Eshete
(74) *Attorney, Agent, or Firm* — Brinks Gilson & Lione

(57) ABSTRACT

An apparatus and a method for controlling a valve includes a first database which stores a plurality of first exhaust cam angles and outputs a first exhaust cam angles corresponding to a current engine speed and inflow air amount. A second database stores a plurality of second exhaust cam angles and outputs a second exhaust cam angles corresponding to the engine speed and inflow air amount. A target angle decision unit selects the exhaust cam angles outputted from the first and second databases as a target angle for controlling an operation of an exhaust valve, in accordance with a current gear stage of a vehicle. A camshaft control unit controls rotational motion of a camshaft coupled to the exhaust cam so that the exhaust cam reaches the target angle, in which the plurality of first exhaust cam angles are in a range in which the exhaust cam is not retarded.

7 Claims, 3 Drawing Sheets

(51) Int. Cl.
  *B60W 20/00* (2016.01)
  *F02D 41/24* (2006.01)
  *F02D 41/00* (2006.01)
  *F02D 41/12* (2006.01)
  *F02D 29/02* (2006.01)

(52) U.S. Cl.
  CPC ..... *F02D 41/0055* (2013.01); *F02D 41/2422* (2013.01); *F02D 29/02* (2013.01); *F02D 41/006* (2013.01); *F02D 41/0065* (2013.01); *F02D 41/12* (2013.01); *Y02T 10/18* (2013.01); *Y02T 10/47* (2013.01)

(58) Field of Classification Search
  USPC ...................................................... 123/90.17
  See application file for complete search history.

(56) References Cited

FOREIGN PATENT DOCUMENTS

| | | | | |
|---|---|---|---|---|
| JP | 2008-215295 A | * | 9/2008 | ................ F01L 1/34 |
| JP | 2012-218520 | | 11/2012 | |
| KR | 10-2012-0124982 | | 11/2012 | |
| KR | 101305655 | | 9/2013 | |

* cited by examiner

APPARATUS AND METHOD FOR CONTROLLING VALVE

CROSS-REFERENCE TO RELATED APPLICATIONS

This application claims the benefit of Korean Patent Application No. 10-2015-0094299, filed on Jul. 1, 2015, the contents of which are incorporated herein by reference in its entirety.

FIELD

The present disclosure relates to an apparatus and a method for controlling a valve, and more particularly, to an apparatus and a method for controlling an exhaust valve of a vehicle.

BACKGROUND

The statements in this section merely provide background information related to the present disclosure and may not constitute prior art.

An exhaust gas recirculation (EGR) device is a device that reduces nitrogen oxides (NOx) in exhaust gas discharged after combustion in an engine. The EGR device recirculates a part of inert exhaust gas into an intake system of the engine in order to reduce generation of NOx by decreasing a maximum temperature at the time of combustion in the engine.

Meanwhile, in a case in which the exhaust gas is recirculated into the intake system of the engine, ignition ability of a gaseous mixture or output of the engine may deteriorate. Therefore, in order to efficiently reduce NOx and ensure drivability of the engine, an EGR rate of the EGR device is controlled in accordance with a driving state of the vehicle.

In order to improve an effect of increasing the EGR rate in an EGR operation section, a method of retarding an exhaust cam for opening and closing an exhaust valve is used. In the case of retarding the exhaust valve, there is a valve overlap period for which an intake valve and the exhaust valve are maintained in an opened state at the same time.

In a case in which there is the valve overlap period, exhaust gas is completely discharged, such that volumetric efficiency of a cylinder is improved, and a cooling effect is improved by reducing a cause of premature ignition.

In contrast, there is a concern in that fuel consumption is increased because the gaseous mixture is discharged together with the exhaust gas for the valve overlap period. Particularly, in a low-speed driving range, because of the valve overlap period, a shock is caused by combustion instability, or a back-fire phenomenon occurs in which combustion occurs through an intake valve.

SUMMARY

The present disclosure provides an apparatus and a method for controlling a valve which improves drivability in a low-speed driving range.

One form of the present disclosure provides an apparatus including: a first database which stores a plurality of first exhaust cam angles, and outputs one of the plurality of first exhaust cam angles which corresponds to current engine speed and inflow air amount; a second database which stores a plurality of second exhaust cam angles, and outputs one of the plurality of second exhaust cam angles which corresponds to the engine speed and the inflow air amount; a target angle decision unit which selects one of the exhaust cam angles outputted from the first and second databases as a target angle of an exhaust cam for controlling an operation of opening and closing an exhaust valve, in accordance with a current gear stage of a vehicle; and a camshaft control unit which controls rotational motion of a camshaft coupled to the exhaust cam so that the exhaust cam reaches the target angle, in which the plurality of first exhaust cam angles is set to be in a range in which the exhaust cam is not retarded.

Another form of the present disclosure provides an apparatus for controlling a valve, the apparatus including: a database which stores a plurality of exhaust cam angles, and outputs one of the plurality of exhaust cam angles which corresponds to current engine speed and inflow air amount; a target angle decision unit which selects one of a predetermined reference exhaust cam angle and the exhaust cam angle outputted from the database as a target angle of an exhaust cam for controlling an operation of opening and closing an exhaust valve, in accordance with a current gear stage of a vehicle; and a camshaft control unit which controls rotational motion of a camshaft coupled to the exhaust cam so that the exhaust cam reaches the target angle, in which the reference exhaust cam angle is set so that the exhaust cam is not retarded.

Yet another form of the present disclosure provides a method of controlling a valve using a valve control apparatus, the method including: detecting a current gear stage of a vehicle; selecting one of an exhaust cam angle, which is determined based on current engine speed and inflow air amount, and a predetermined reference exhaust cam angle as a target angle of an exhaust cam for controlling an operation of opening and closing an exhaust valve, in accordance with the current gear stage; and controlling rotational motion of a camshaft coupled to the exhaust cam so that the exhaust cam reaches the target angle, in which the reference exhaust cam angle is set so that the exhaust cam is not retarded.

According to the forms of the present disclosure, it is possible to improve drivability in a low-stage and low-speed range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
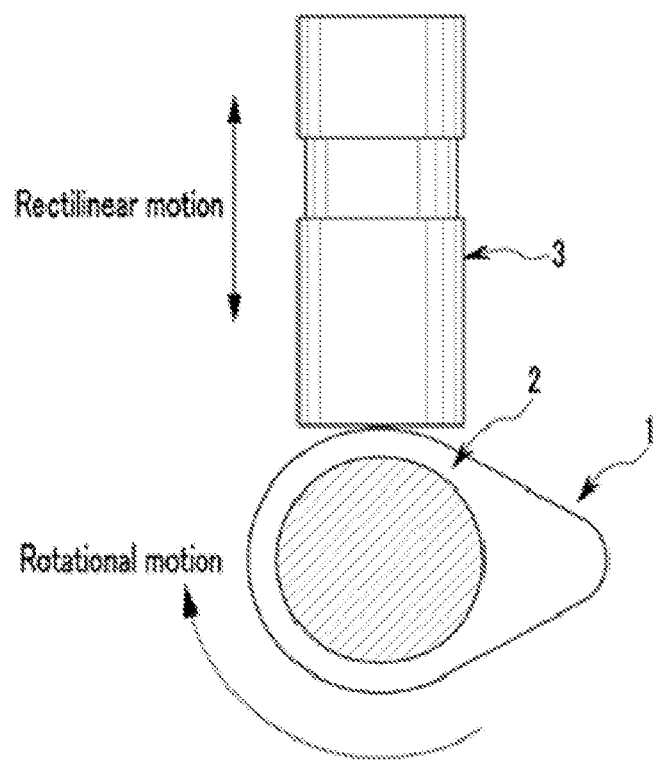
FIG. 1 is a view for explaining an operation of a typical cam.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout this specification and the claims that follow, when it is described that an element is "coupled" to another element, the element may be "directly coupled" to the other element or "electrically coupled" to the other element through a third element.

FIG. 1 is a view for explaining an operation of a typical cam.

A cam 1 is a mechanical device that converts its own rotational motion into rectilinear motion of another mechanical element 3. The cam 1 is mainly used as a valve driving mechanism that opens and closes a valve.

Referring to FIG. 1, the cam 1 is integrally coupled to a camshaft 2, and rotates in a rotation direction of the camshaft 2. The rotational motion of the cam 1 is transferred to a lifter (or follower) 3, and generates rectilinear motion of the lifter (or follower) 3. The rectilinear motion of the lifter 3 is transferred to a valve (not illustrated) via a pushrod (not illustrated) and a rocker arm (not illustrated), and is used to open and close the valve.

The cam 1 has an eccentric shape, and because of the shape of the cam 1, a position of the lifter (or follower) 3 is changed depending on a rotation angle of the cam 1. An opening degree of the valve is changed depending on the position of the lifter (or follower) 3.

Therefore, the following apparatus for controlling a valve may adjust the opening degree of the valve by adjusting the rotation angle of the cam 1.

Figure 2:
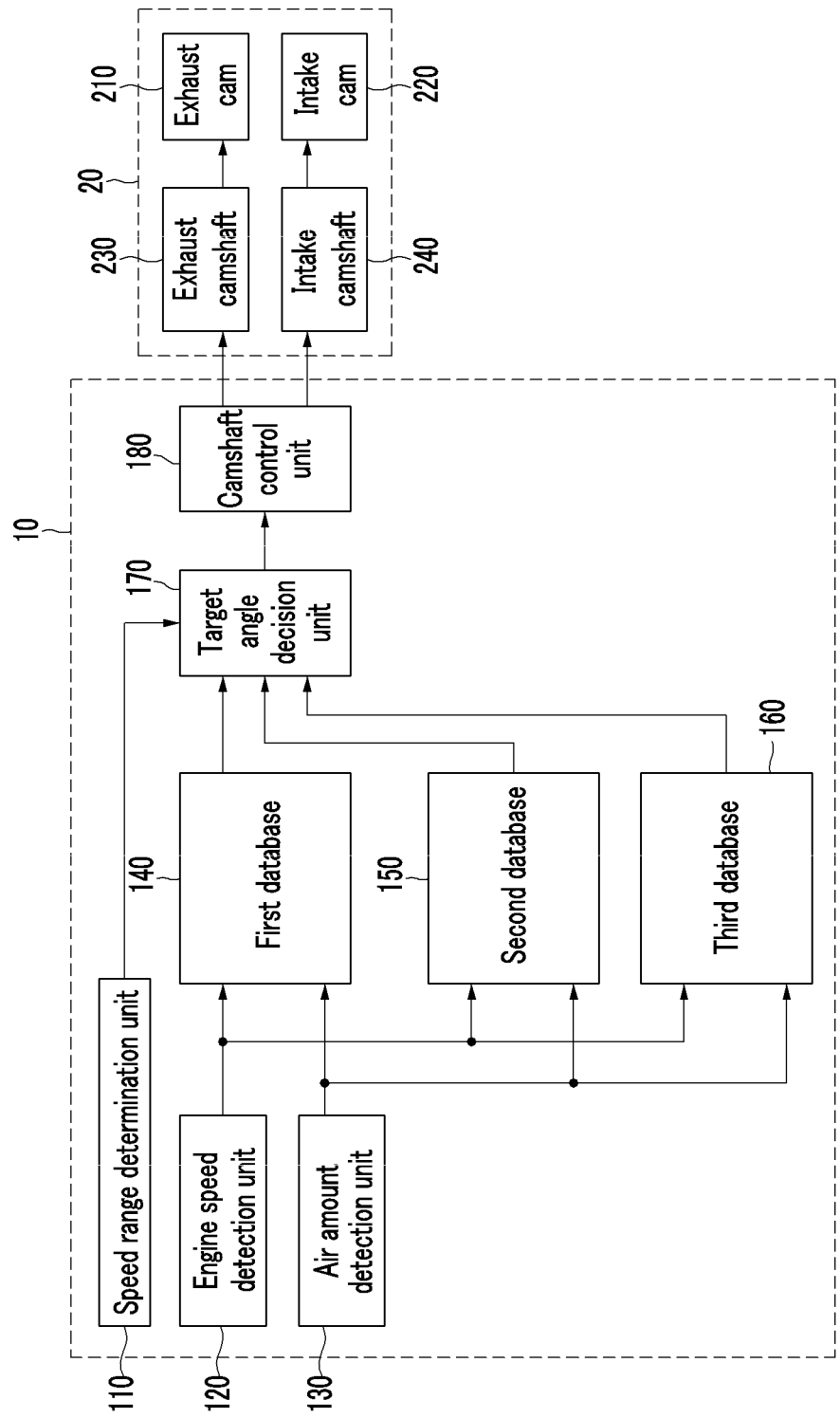
FIG. 2 is a configuration diagram schematically illustrating an apparatus for controlling a valve according to a form of the present disclosure.

FIG. 2 is a configuration diagram schematically illustrating an apparatus for controlling a valve according to one form of the present disclosure.

Referring to FIG. 2, an apparatus 10 for controlling a valve according to a form of the present disclosure may include a speed range determination unit 110, an engine speed detection unit 120, an air amount detection unit 130, a first database 140, a second database 150, a third database 160, a target angle decision unit 170, and a camshaft control unit 180.

The speed range determination unit 110 detects a current gear stage of a vehicle, and classifies a speed range of the vehicle into a low-speed range and a high-speed range based on the current gear stage. That is, the speed range determination unit 110 compares the current gear stage with a predetermined low-stage reference value (or high-stage reference value), and determines that the speed range of the vehicle is the low-speed range (or high-speed range) when the current gear stage is the predetermined low-stage reference value or less (or high-stage reference value or more). In contrast, when the current gear stage is more than the predetermined low-stage reference value (or less than the high-stage reference value), the speed range determination unit 110 determines that the speed range of the vehicle is the high-speed range (or low-speed range). For example, the speed range determination unit 110 determines that the speed range of the vehicle is the low-speed range when the current gear stage is a first stage or a second stage, and determines that the speed range of the vehicle is the high-speed range when the current gear stage is a third stage or higher.

The engine speed detection unit 120 detects a rotational speed (RPM) of the engine. The engine speed detection unit 120 may include a crank position sensor that detects a phase change of a crankshaft (not illustrated). The engine speed detection unit 120 obtains an engine speed from the phase change of the crankshaft, which is detected by the crank position sensor.

The air amount detection unit 130 detects the amount of air flowing into a cylinder of the engine (not illustrated). The air amount detection unit 130 may include various types of sensors such as a pressure sensor, and a flow rate sensor which measures the amount of air flowing into the cylinder of the engine.

The first and second databases 140 and 150 are databases that classify, store, and manage exhaust cam angles in accordance with a driving point of the engine which is determined based on the engine speed and the inflow air amount. That is, the first and second databases 140 and 150 store a plurality of exhaust cam angles, and when the current engine speed and inflow air amount of the vehicle are inputted from the engine speed detection unit 120 and the air amount detection unit 130, respectively, the first and second databases 140 and 150 may output a corresponding exhaust cam angle of the stored exhaust cam angles.

The first and second databases 140 and 150 may be activated or may not be activated depending on the speed range of the vehicle. That is, the first database 140 may be activated to be used to obtain a target angle of an exhaust cam 210 when the speed range of the vehicle is included in the low-speed range, and the second database 150 may be activated to be used to obtain the target angle of the exhaust cam 210 when the speed range of the vehicle is included in the high-speed range.

In one form of the present disclosure, in order to improve an EGR rate of an EGR device and reduce combustion instability and a shock phenomenon caused by valve overlap in which an intake valve and an exhaust valve are simultaneously opened when the vehicle travels at a low speed, a method of obtaining the target angle of the exhaust cam 210 is classified into two methods in accordance with the speed range of the vehicle.

In the case of a hybrid vehicle, in order to switch a traveling mode from a hybrid electric vehicle (HEV) mode to an electric vehicle (EV) mode as a traveling speed is decreased, engine torque is decreased to disengage an engine clutch, and an EGR valve is closed. In this process, when the exhaust cam angle is controlled to be retarded so that the valve overlap occurs, a shock phenomenon may occur because of combustion instability. In addition, even in a tip-out situation in which a driver releases an accelerator pedal in a state in which the vehicle travels at a low speed, the control operation of retarding the exhaust cam 210 causes combustion instability and a shock phenomenon. Therefore, it is necessary to reduce combustion instability and a shock phenomenon and improve drivability of the vehicle by adjusting the exhaust cam angle so as to reduce the occurrence of the valve overlap in a state in which the vehicle travels at a low speed.

Therefore, the exhaust cam angle outputted from the first database 140 used in the low-speed range is set to be in a range in which the valve overlap is less likely to occur. That is, the exhaust cam angles included in the first database 140 are values that are predetermined in an angle range in which the exhaust cam 210 is not retarded, that is, the valve overlap does not occur. Meanwhile, the exhaust cam angles included in the first database 140 may be set to vary in accordance with the engine speed and the inflow air amount, or may be set to the same angle regardless of the engine speed and the inflow air amount. The first database 140 may output different exhaust cam angles in accordance with the inputted engine speed and inflow air amount. In contrast, the first database 140 may output a predetermined reference angle as the exhaust cam angle regardless of the inputted engine speed and inflow air amount. The reference angle is a predetermined angle that reduces the occurrence of the valve overlap in which the intake valve and the exhaust valve are opened simultaneously, and the reference angle may be set to vary in accordance with the type of vehicle, the shape of the exhaust cam 210, and the like.

The valve overlap in which the intake valve and the exhaust valve are opened simultaneously has an effect of maximizing the EGR rate and improving volumetric efficiency of the cylinder. Therefore, the valve overlap is permitted in the high-speed range in which combustion instability and a shock phenomenon caused by the valve overlap are reduced.

Therefore, the exhaust cam angle outputted from the second database 150 used in the high-speed range may be determined based on the engine speed and the inflow air amount regardless of the valve overlap. That is, the range of the exhaust cam angles included in the second database 150 need not be limited, and is determined based on the engine speed and the inflow air amount.

The third database 160 is a database that classifies, stores, and manages intake cam angles in accordance with the driving point of the engine which is determined based on the engine speed and the inflow air amount. That is, when the current engine speed and inflow air amount of the vehicle are inputted from the engine speed detection unit 120 and the air amount detection unit 130, respectively, the third database 160 may output an intake cam angle that corresponds to the current engine speed and inflow air amount of the vehicle among the pre-stored angles.

The target angle decision unit 170 selects any one of the exhaust cam angles outputted from the first and second databases 150 as the target angle of the exhaust cam 210 based on the speed range of the vehicle, which is determined by the speed range determination unit 110. Further, the target angle decision unit 170 transfers the selected target angle of the exhaust cam 210, together with the target angle of an intake cam 220 which is outputted from the third database 160, to the camshaft control unit 180.

The camshaft control unit 180 receives the target angles of the exhaust cam 210 and the intake cam 220 from the target angle decision unit 170, and rotates an exhaust camshaft 230 and an intake camshaft 240 based on the target angles so that the exhaust cam 210 and the intake cam 220 reach the target angles, respectively.

The exhaust cam 210 and the intake cam 220 are components of the valve driving mechanism that opens and closes the exhaust valve (not illustrated) and the intake valve (not illustrated) of an intake and exhaust system 20. Here, the exhaust valve is installed to be spaced apart from the intake valve at a predetermined interval, and serves to discharge the gaseous mixture in the cylinder of the engine to the outside in accordance with an operation of opening and closing the exhaust valve. In addition, the intake valve is installed to be adjacent to a combustion chamber of the vehicle, and serves to draw outside air into the cylinder of the engine in accordance with an operation of opening and closing the intake valve.

As described above with reference to FIG. 1, the cam is a mechanical device that converts its own rotational motion into rectilinear reciprocal motion of another mechanical element. That is, the exhaust cam 210 transfers its own rotational motion to the exhaust valve and generates rectilinear motion of the exhaust valve, thereby opening and closing the exhaust valve. In addition, the intake cam 220 transfers its own rotational motion to the intake valve, and generates rectilinear motion of the intake valve, thereby opening and closing the intake valve.

The exhaust cam 210 and the intake cam 220 are integrally coupled to the exhaust camshaft 230 and the intake camshaft 240, respectively, and are rotated in conjunction with rotational motion of the camshafts 230 and 240.

Therefore, the target angle decision unit 170 may rotate and control the exhaust camshaft 230 and the intake camshaft 240 so that the exhaust cam 210 and the intake cam 220 reach desired angles.

The apparatus 10 for controlling a valve according to one form of the present disclosure may be mounted in an engine controller (engine management system (EMS)) of the vehicle, but the present disclosure is not necessarily limited thereto. The apparatus 10 for controlling a valve may be mounted in controllers other than the engine controller, or may be configured as a separate controller.

Figure 3:
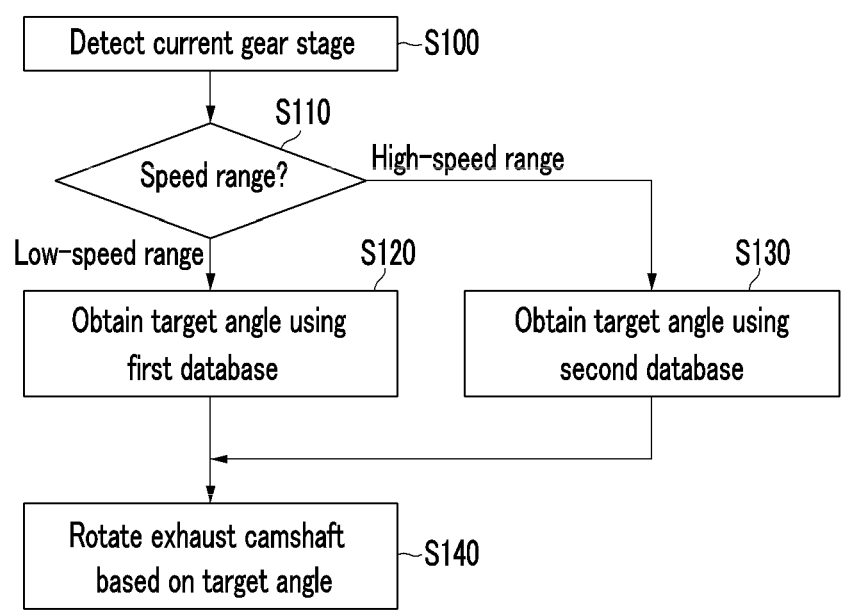
FIG. 3 is a flowchart schematically illustrating a method of controlling an exhaust valve using the apparatus for controlling a valve according to a form of the present disclosure.

FIG. 3 is a flowchart schematically illustrating a method of controlling the exhaust valve using the apparatus for controlling a valve according to one form of the present disclosure.

Referring to FIG. 3, the apparatus 10 detects the current gear stage of the vehicle (S100). Further, based on the current gear stage, the apparatus 10 determines whether the speed range of the vehicle is included in the low-speed range or the high-speed range (S110).

At step S110, in a case in which the speed range of the vehicle is included in the low-speed range, the apparatus 10 for controlling a valve obtains the exhaust cam angle using the first database 140 (S120).

At step S120, the first database 140 is a database that classifies, stores, and manages the exhaust cam angle in accordance with the engine speed and the inflow air amount. Values of the angles included in the first database 140 are limited to be within a range in which the valve overlap does not occur. The first database 140 may output different angles in accordance with the inputted engine speed and inflow air amount, or may output the same reference angle as the exhaust cam angle regardless of the engine speed and the inflow air amount.

At step S110, in a case in which the speed range of the vehicle is included in the high-speed range, the apparatus 10 for controlling a valve obtains the exhaust cam angle using the second database 150 (S130).

At step S130, the second database 150 is a database that classifies, stores, and manages the exhaust cam angle in accordance with the engine speed and the inflow air amount. Values of the angles included in the second database 150 are determined based on the engine speed and the inflow air amount, and ranges of the angles are not limited.

As the exhaust cam angle is determined through step S120 or step S130, the apparatus 10 for controlling a valve rotates the exhaust camshaft 230 so that the exhaust cam angle reaches a predetermined angle (S140).

According to the aforementioned description, the apparatus 10 for controlling a valve according to one form of the present disclosure classifies the speed range of the vehicle based on the gear stage of the vehicle. Further, when the speed range of the vehicle is included in the low-speed range, the apparatus 10 limits the exhaust cam angle so as to reduce the occurrence of the valve overlap caused by the control operation of retarding the exhaust valve, or fixes the exhaust cam angle to be the predetermined reference angle. Accordingly, it is possible to reduce combustion instability and a shock phenomenon caused by the valve overlap when the vehicle travels at a low speed.

The method of controlling a valve according to the exemplary forms of the present disclosure may be carried out by software. When the method is carried out by software, the constituent elements of the present disclosure are code segments that perform desired operations. A program or the code segments may be stored in a processor readable medium, or may be transferred by a computer data signal coupled to a carrier wave through transmission media or a communication network.

A computer readable recording medium includes all types of recording devices, which store data readable by a computer system. An example of the computer readable recording medium includes ROM, RAM, CD-ROM, DVD_ROM, DVD_RAM, magnetic tapes, floppy disks, hard disks, and optical data storage systems. In addition, the computer readable recording media may be distributed in computer device connected via networks, such that computer readable codes may be stored and activated in a distributed manner.

While this disclosure has been described in connection with the above forms, it is to be understood that the disclosure is not limited to the disclosed forms, but, on the contrary, is intended to cover various modifications and equivalent arrangements included within the spirit and scope of the appended claims.

What is claimed is:

1. An apparatus for controlling a valve, the apparatus comprising:
    a first database which stores a plurality of first exhaust cam angles, and outputs one of the plurality of first exhaust cam angles which corresponds to current engine speed and inflow air amount;
    a second database which stores a plurality of second exhaust cam angles, and outputs one of the plurality of second exhaust cam angles which corresponds to the engine speed and the inflow air amount;
    a target angle decision unit which selects one of the exhaust cam angles outputted from the first and second databases as a target angle of an exhaust cam for controlling an operation of opening and closing an exhaust valve, in accordance with a current gear stage of a vehicle; and
    a camshaft control unit which controls rotational motion of a camshaft coupled to the exhaust cam so that the exhaust cam reaches the target angle,
    wherein the plurality of first exhaust cam angles are set to be in a range in which the exhaust cam is not retarded,
    wherein the target angle decision unit selects an exhaust cam angle outputted from the first database as the target angle when the current gear stage is a predetermined reference gear stage or lower, and
    wherein the target angle decision unit selects an exhaust cam angle outputted from the second database as the target angle when the current gear stage is higher than the reference gear stage.

2. The apparatus of claim 1, further comprising
    an engine speed detection unit which detects the engine speed.

3. The apparatus of claim 1, further comprising
    an air amount detection unit which detects the inflow air amount.

4. An apparatus for controlling a valve, the apparatus comprising:
    a database which stores a plurality of exhaust cam angles, and outputs one of the plurality of exhaust cam angles which corresponds to current engine speed and inflow air amount;
    a target angle decision unit which selects one of a predetermined reference exhaust cam angle and the exhaust cam angle outputted from the database as a target angle of an exhaust cam for controlling an operation of opening and closing an exhaust valve, in accordance with a current gear stage of a vehicle; and
    a camshaft control unit which controls rotational motion of a camshaft coupled to the exhaust cam so that the exhaust cam reaches the target angle,
    wherein the reference exhaust cam angle is set so that the exhaust cam is not retarded,
    wherein the target angle decision unit selects the reference exhaust cam angle as the target angle when the current gear stage is a predetermined reference gear stage or lower, and
    wherein the target angle decision unit selects the exhaust cam angle outputted from the database as the target angle when the current gear stage is higher than the reference gear stage.

5. A method of controlling a valve using a valve control apparatus, the method comprising:
    detecting a current gear stage of a vehicle;
    selecting one of an exhaust cam angle, which is determined based on current engine speed and inflow air amount, and a predetermined reference exhaust cam angle as a target angle of an exhaust cam for controlling an operation of opening and closing an exhaust valve, in accordance with the current gear stage; and
    controlling rotational motion of a camshaft coupled to the exhaust cam so that the exhaust cam reaches the target angle,
    wherein the reference exhaust cam angle is set so that the exhaust cam is not retarded,
    wherein the selecting of the exhaust cam angle selects the predetermined reference exhaust cam angle as the target angle when the current gear stage is a predetermined reference gear stage or lower, and
    wherein the selecting of the exhaust cam angle selects the exhaust cam angle as the target angle when the current gear stage is higher than the predetermined reference gear stage.

6. The method of claim 5, further comprising:
    detecting the engine speed; and
    detecting the inflow air amount.

7. The method of claim 5, further comprising
    determining the exhaust cam angle based on the engine speed and the inflow air amount.

* * * * *